United States Patent [19]

Bouteille

[11] 4,450,861

[45] May 29, 1984

[54] COMPRESSED GAS SAVING DEVICE

[76] Inventor: Daniel Bouteille, 2 Allée des Châtaigniers "Le Monastère", Ville d'Avray, France, 92410

[21] Appl. No.: 254,618

[22] Filed: Apr. 16, 1981

[30] Foreign Application Priority Data

Apr. 23, 1980 [FR] France ............................... 80 09141
Dec. 18, 1980 [FR] France ............................... 80 26943

[51] Int. Cl.³ ............................................. F16K 37/00
[52] U.S. Cl. ................................ 137/553; 137/493.8; 137/516.15; 137/524
[58] Field of Search ............... 137/614.19, 614.2, 553, 137/524, 493.8, 493.7, 853, 512.15, 516.15

[56] References Cited

U.S. PATENT DOCUMENTS

| 1,583,834 | 5/1926 | Humphrey | 137/493.7 |
| 2,321,679 | 6/1943 | Houston | 137/524 |
| 2,536,505 | 1/1951 | Kircher | 137/524 |
| 3,099,997 | 8/1963 | Kroffke | 137/493.8 |
| 3,342,208 | 9/1967 | Steffes | 137/853 |
| 3,865,133 | 2/1975 | Alford | 137/853 |
| 4,195,552 | 4/1980 | Neff | 91/448 |
| 4,197,874 | 4/1980 | Neff | 137/270 |
| 4,279,271 | 7/1981 | Neff | 137/493.8 |

FOREIGN PATENT DOCUMENTS 960929 6/1964 United Kingdom ............. 137/493.8

OTHER PUBLICATIONS

Machine Design, vol. 31, No. 10, p. 166, May 1959.

Primary Examiner—A. Michael Chambers
Attorney, Agent, or Firm—Shenier & O'Connor

[57] ABSTRACT

Compressed gas saving device designed to be implanted in a pipe system connecting a control valve outlet to the inlet of a pressure-user apparatus constituted by a body in which a first passage is provided which passage starts from a first end of the body, provided with means connecting it to the control valve, towards a second end of the body, provided with means connecting it to the said pipe system, the first passage traversing a seat provided in the said body, and adapted to be closed off by a valve returned on the said seat by a spring member, the effect of which is adjustable in intensity by means of a hand-operated adjusting member and tends to oppose the rising force of the valve head generated by the gas flowing from the control valve, whereas a second passage, provided in the body, constitutes a bias of the said first passage, short-circuiting the aforesaid valve head provided with a one-way valve whose flowing direction is that of the gas issued from the pressure-user apparatus, the said adjusting member controlling an indicator means in the form of a visual indicator which is instantly locatable in relation to the external surface of the said body.

10 Claims, 9 Drawing Figures

COMPRESSED GAS SAVING DEVICE

The needs in compressed gas, and therefore in pressure levels, of a pressure-user pneumatic apparatus, are different depending on whether the apparatus is actuated in a working direction or in return direction (virtually "idle"). But, to feed a pressure-user apparatus at the same pressure level—which is necessarily the maximum level—leads to a loss of compressed gas through unnecessary expansion when the gase exhausts.

Moreover, every pressure-user apparatus in a pneumatic installation has its own very specific needs. This excluding to have to provide, in each installation, for several pressure levels at the source, all the more so that the flow regulation would as a result, be extremely complex. The idea behind the invention is to save compressed gas by producing an expansion of the gas at the exhaust of the flow regulating devices, i.e. on the pipes connecting the said control valves to the pressure-user apparatus. Since the compressed gas normally flows in both directions inside these pipes, the expansion must be one-way.

This object is reached with the device according to the invention without the installation being complicated by the addition of more components. Also, with the device according to the invention it is possible to adjust the pressure levels in relation to the specific needs of the pressure-user apparatus. Finally, the invention permits to control instantly and with accuracy the installation and the operation of the device, thereby indicating whether everything in a production plant is geared towards savings and whether such savings are effectively obtained.

To this effect, the invention proposes a compressed gas saving device designed to be implanted in a pipe system connecting a control valve outlet to the inlet of a pressure-user apparatus. According to the invention, said device is constituted by a body in which a first passage is provided which passage starts from a first end of the body, provided with means connecting it to the control valve, towards a second end of the body, provided with means connecting it to the said pipe, system, the first passage traversing a seat provided in the said body, and adapted to be closed off by a valve returned on the said seat by a return spring member, the effect of which is adjustable in intensity by means of a hand-operated adjusting member and tends to oppose the rising force of the valve head generated by the gas flowing from the control valve, whereas a second passage, provided in the body, constitutes a bias of the said first passage, short-circuiting the aforesaid valve head provided with a one-way valve whose flowing direction is that of the gas issued from the pressure-user apparatus, the said adjusting member controlling an indicator means in the form of a visual indicator which is instantly locatable in relation to the external surface of the said body.

According to a preferred embodiment of the invention, the said body is shaped as a connector and comprises in its centre part, a lateral opening situated vertically and co-axially to the said seat, forming an endpiece, closed by a plug, the said valve being constituted by a member movable with respect to the said plug, and subjected to the effect of a spring placed therebetween, whereas the plug is placed so as to be axially adjustable inside the said endpiece to constitute the said adjusting member and comprises an end portion, integral therewith, and adapted to project from the end of said endpiece to constitute the said visual indicator.

In the case where the connector is an elbow connector, said connector is constituted by a first longitudinal element provided with a central cavity, closed off by the said plug at its end forming the said endpiece which is opposite the said connecting end and comprising at least two separate side openings between which the said seat is provided, concentrically to the said cavity and by a second element provided with a transverse bore designed to receive the said first element and with a longitudinal conduit communicating with the cavity of the first element directly through the opening situated on the valve side with respect to the said seat, and selectively by means of the said one-way valve through the other opening.

The invention will be more readily understood on reading the following description with reference to the accompanying drawings, in which.

Figure 1:
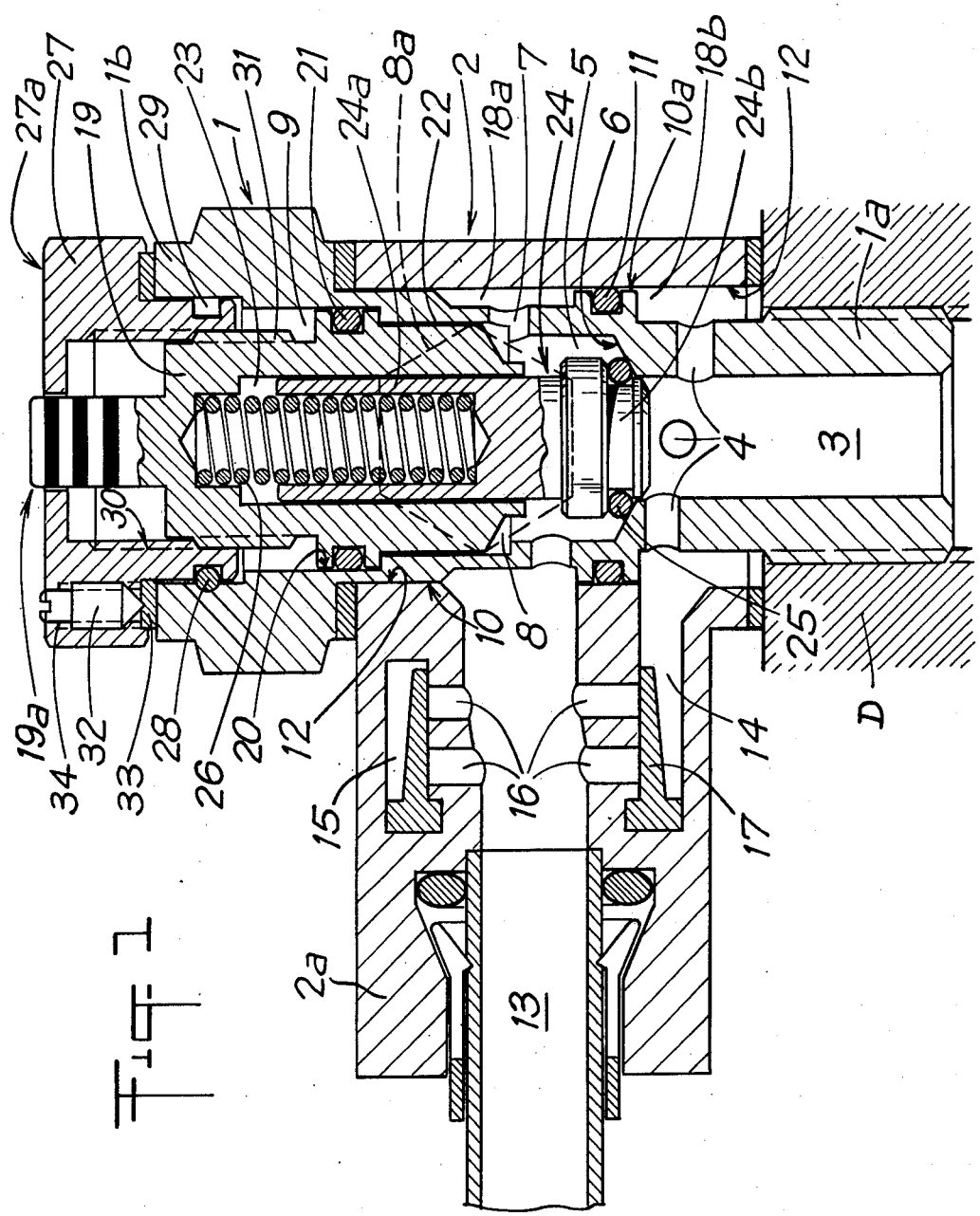
FIG. 1 is a cross-sectional view of a first embodiment of the invention, with in FIG. 1a a variant of a detail.

Referring first to FIG. 1, there is shown a device which is in the form of an elbow connection, known as a "Banjo connection" whose body comprises two substantially orthogonal elements 1 and 2. Element 1 is in the form of a cylindrical elongate element provided with an inside cavity comprising several co-axial parts. A first section 3 of said cavity, situated on one side of the end 1a of element 1 carrying the means (in this case, an external thread) to connect it to the exhaust of a control valve D, is bore-shaped and communicates by way of radial openings 4 with the outside of the element 1. A second part 5 of the said cavity extends the section 3 with a larger diameter. The cone-shaped joining surface 6 of the sections 3 and 5 constitute a valve-seat provided in the said element 1. Said section 5 also communicates with the outside of the element 1 via radial ports 7. Above said ports 7, the section 5 is extended by a polygonal recess 8 (hexagonal in this case as shown in the turned down cross-section in 8a in the figure) which is in turn extended by a cylindrical bore portion 9 issuing to the outside of element 1 by its end 1b opposite the said end 1a and forming a lateral endpiece.

Externally, the element 1 comprises, in its centre part, a cylindrical surface 10, of which a portion 10a situated between the openings 4 and the ports 7 is provided with a peripheral groove inside which is housed an O-ring 11. Its upper part 1b is polygonal with six sides.

The element 2 of the body is elongated along an axis orthogonal to the longitudinal axis of the element 1. Said element 2 is provided with a bore 12 transversal to its axis and wherein is housed the said element 1. A substantially longitudinal conduit 13 covers the element 2 from its end 2a normally provided with means to connect it to a pipe issuing into a pressure-user apparatus not shown, up to the bore 12. A conduit 14 substantially parallel to the conduit 13 also issues into the core 12 to arrive at an annular chamber 15 provided around the conduit 13. Radial openings 16 create a communication between the chamber 15 and the conduit 13. A deformable annular element 17 (skirt-shaped in this case,) covers the issues of the passages 16 into the chamber 15. It should be noted that when the element 1 is in position inside the element 2, the bore 12 is divided into two annular chambers 18a and 18b, external to the element 1 and isolated one from the other by the O-ring 11. The conduit 13 and the ports 7 issue into the chamber 18a. The ports 4 and the conduit 14 issue into the chamber 18b.

The cavity inside the element 1 is closed off on the side of the endpiece by a plug 19 which comprises a cylindrical bearing 20 provided with an O-ring 21 adapted to slide in tight manner on the walls of the bore 9 and a polygonal part 22 which is complementary to the said part 8 of the cavity. Thus, the said plug can slide but cannot rotate with respect to the element 1. A blind bore 23 is provided inside the plug 19 and guides the sliding movement of the tail 24a of a valve 24 whose head 24b cooperates with the surface 6 via an O-ring 25 for closing the way between the said bores 3 and 5. A return spring 26 is arranged in the blind bore 23 between the plug and the valve, and tends to apply the valve head against the seat.

An externally-milled knob 27 is mounted for rotation on the endpiece 1b and is immobilized in translation with respect to the latter by means of at least one pin 28 cooperating with a groove 29 of the said knob. Said knob is provided with an internal screw and can be screwed on an external thread 31 of the plug 19. Thus, by turning the knob 27, the thread 31 is caused to penetrate more or less into the thread 30 and as a result the plug 19 is caused to slide either upwards or downwards, with respect to the element 1. The knob 27 topping the end 1b of the element 1 has a front surface 27a from which a screw 32 can be reached by hand. Said screw is mounted in a tapping perpendicular to the face 27a and can project in the direction of the frontal face of the element 1 which may be covered with a flexible synthetic braking member 33. When the screw 32 penetrates by a pointed end into the material 33, it constitutes a means for locking the knob 27 in rotation with respect to the element 1. Advantageously, said screw will be safely secured by means of a flange 34.

Finally, the plug 19 is provided at its end adjacent the knob 27 with an axial lug 19a adapted to project more or less from the surface 27a and in this way to constitute a visual indicator of the position of the plug 19 with respect to the element 1. The lug 19a will carry visible markings—such as graduated strips, figures or the like—either painted on, or marked in, or in the form of added supports . . . which will strongly contrast with the external appearance of the rest of the apparatus.

As regards the flow of a pressurized gas in the device described hereinabove, it should be noted that the gas flowing from the control valve, i.e. the gas flowing into the bore 3 fills the annular chamber 18b, the channel 14 and the chamber 15. It is obvious that the element 2 is in sealed resting contact on a surface of the said control valve and the chamber 18b is closed at its lower end. The fluid then tends to apply the skirt 17 against the openings 16 and to close the access through there to the conduit 13. The gas then pushes back the valve 24 against the action of the spring 26 and opens the way between the bore 3 and the bore 5. The passageway at this level is dependent on the force of the spring for a given gas pressure. There occurs then an expansion of the gas by lamination of the gas between the valve 24 and the valve seat 6 and the gas flows through the ports 7, the chamber 18a into the conduit 13 and thus towards the pressure-user apparatus under a lesser pressure than the intake pressure into the bore 3. The pressure having been reduced, there is then a saving in the quantity of gas directed towards the pressure-user apparatus.

On the contrary, if the gas comes from the pressure-user apparatus, when for example, the bore 3 communicates with the exhaust via the control valve, said gas cannot go through the bores 5 and 3, the valve 24 being applied on its seat 6, but it reaches the bore 3 via the passages 16, the chamber 15, the conduit 14, the chamber 18b and the ports 4, the skirt 17 opening under the effect of the pressure of the gas and uncovering the issue of the passages 16 into the chamber 15.

To sum up, it is clear that the device according to the invention has a first passage, 3, 5, 7, 18a, 13 equipped with a valve 6, 24, which is calibrated in adjustable manner as indicated hereinafter, and a second passage 4, 18b, 14, 15, 16 creating a bias of the said passage to short-circuit the calibrated valve, said second passage being provided with a one-way valve 17 whose flowing direction is that of pressure-user/control valve. It should be noted that the non-return valve which in this case is situated outside the element 1, thus permitting to have in said element, as long a passageway as possible, can take various known forms. FIG. 1a shows a variant of embodiment wherein two O-rings 17a and 17b situated in trapezoidal grooves act as a skirt.

As we have seen, the expansion of the gas, and thus the savings made, is dependent on the return force of the valve head 24b on the surface 6, and thus of the winding of the spring 26. By operating the knob 27, the plug 19 is brought closer to, or away from the seat 6. The bringing closer movement leads to the compression of the spring 26 (which is an open-coil spring), and so to increasing its return effect. In consequence, for a maximum compression, a maximum expansion will be obtained, hence a maximum saving in compressed gas. The visual indicator 19a will then be completely retracted inside the plug 27 (as shown in FIG. 1).

If on the contrary the plug 19 is moved at a maximum distance apart from the seat 6, the spring is released to a maximum and the gas saving is negligible. The visual indicator 19a is then brought out to a maximum with respect to the plug 27.

For example, a simple glance to the device according to the invention reveals whether it is in working order and so whether an economy is made. This can be checked at any moment, whether or not the installation is in operation, the visual indicator being a means to check the position of the plug 19 whose function is that of a member for adjusting the tension of the spring, and not of a pressure gauge, no matter how simplified. The locking into an adjusted position of the knob 27 by the screw 32, which knob cannot be reached by hand, prevents any inadvertent or deliberate handling of the knob 27 and therefore contributes to economizing the air and to keeping this economy constant.

Figure 2:
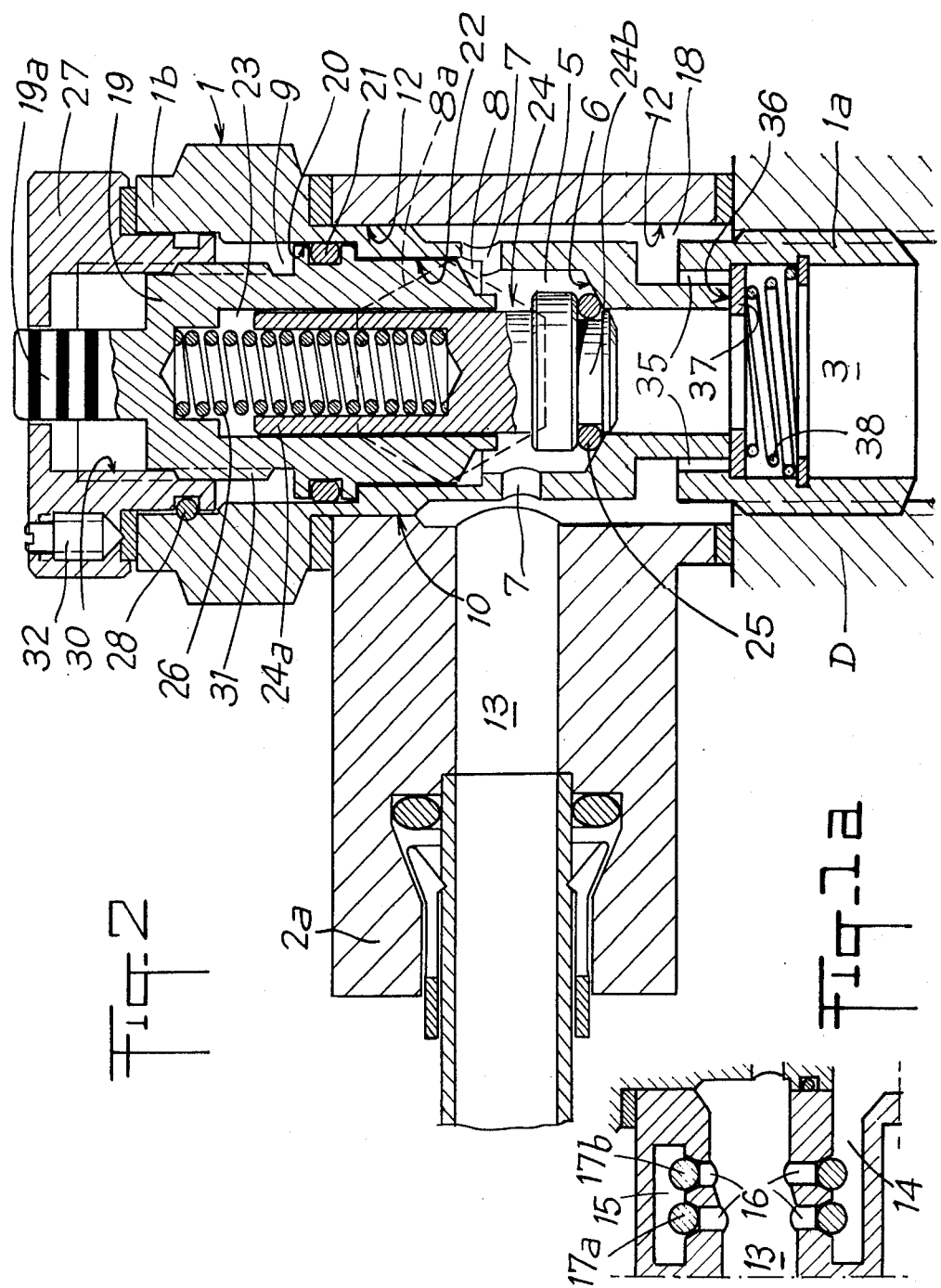
FIG. 2 is a cross-sectional view of a variant embodiment of FIG. 1.

FIG. 2 shows a variant of the embodiment shown in FIG. 1, in which some of the elements described hereinabove are also found with the same reference numerals. Said variant concerns essentially the one-way valve. The element 2 is provided with only one conduit 13 issuing into the bore 12. The element 1 determines, inside the bore 12, a single chamber 18 inside which issue the orifices 35 and the ports 7. Said orifices 35 issue into the bore 3 at the level of a shoulder 36 constituting a seat for a small annular plate 37 which forms a valve head and which is recalled to its closing position by a spring 38. When the gas flows from the bore 3, the orifices 35 are closed by the spring 38 and by the pressure of the gas. On the contrary, when the gas flows from the conduit 13 it pushes the plate 37 downwards and uncovers the orifices 35. Thus the first passage is constituted by the bores 3 and 5, the chamber 18 and the conduit 13, the second passage being solely constituted by the orifices 35. Other known elements, such as a flexible skirt associated to radial orifices, can also be used as one-way valve.

Figure 3:
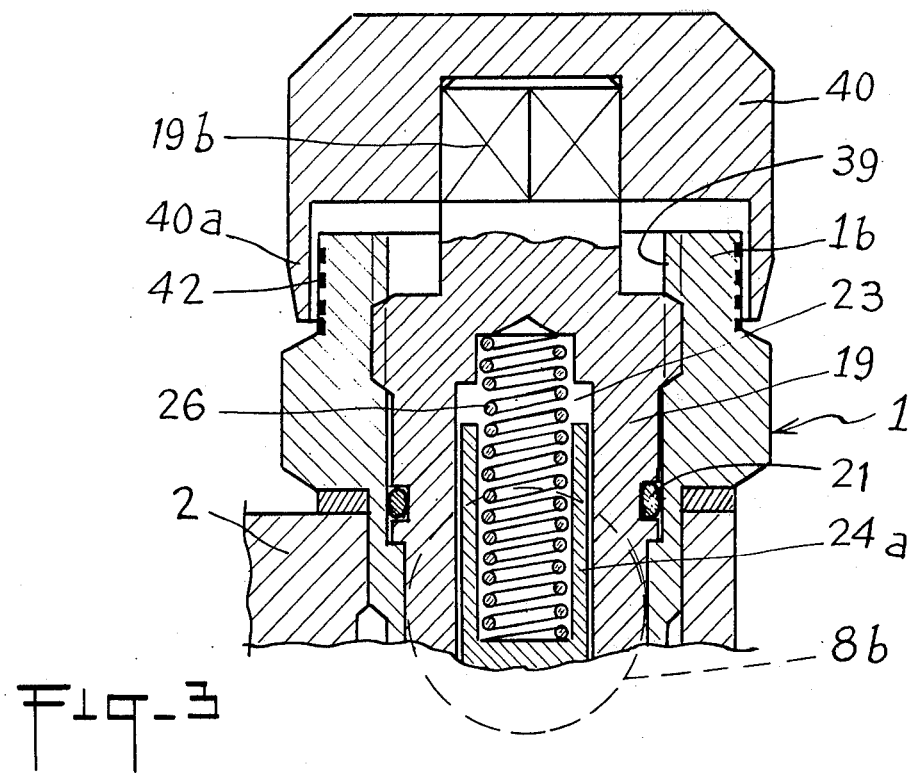
FIGS. 3 and 4 illustrate variant embodiments of the visual indicator.

Referring now to FIG. 3, this shows that the plug 19, whose cross-section 8b is this time cylinder-shaped, constitutes the screw, movable in rotation and in translation of a nut-and-screw system, whose fixed screw is constituted by the upper part 1b of the element 1, which part is provided with an internal thread 39. The rotation of the plug 19 is effected by means of a milled knob 40 and a driving square 19b is provided at the end of the plug 19. The knob 40 comprises a skirt 40a which is adapted to more or less hide the outer surface of the part 1b carrying the markings 41 and thus to more or less hide these in order to constitute the said visual indicator.

Figure 4:
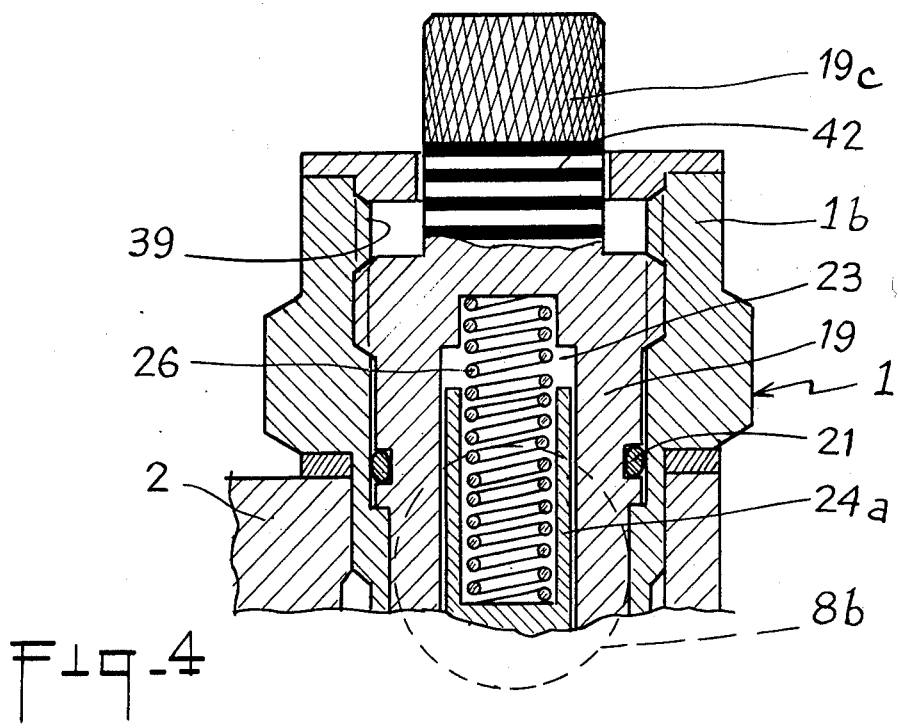

Finally, in FIG. 4, the plug 19 is also a screw, as in FIG. 3, which screw cooperates with the fixed internal threading 39 and it is operated by the end 19c proper of the milled plug situated above a zone 19d provided with markings 42 which project more or less from the said end 1b to constitute the visual indicator.

Figure 5:
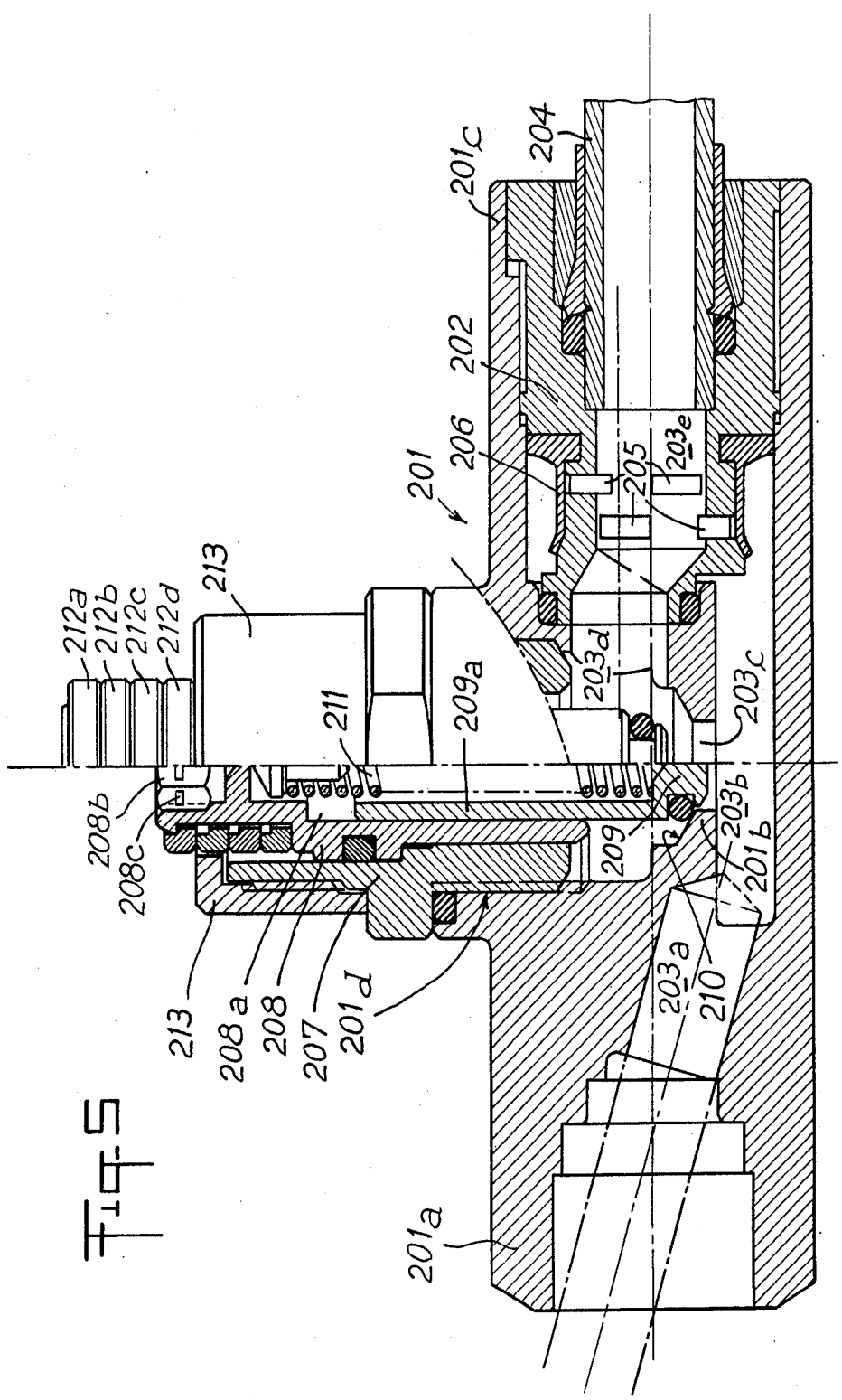
FIG. 5 is a view showing partial cross-sections of a second embodiment of the device according to the invention.

The device illustrated in FIG. 5 is constituted by a body 201 inside which are defined, by means of an added insert 202, conduits for the gas flow. These conduits comprise a bore 203a on the side of the end 201a of the body which is connected to a pipe portion issued from the control valve and opening into a central chamber 203b, which chamber communicates with a second chamber 203d via a conduit 203c traversing a wall 201b of the body 201. The insert 202 situated on the side of the end 201c of the body which is connected to a pipe system 204 leading to the pressure-user apparatus, defines an internal conduit 203e which is connected directly to the chamber 203d and, via side openings 205, to the chamber 203c, by means of a non-return valve in the form of a deformable annular element 206. The assembly of these conduits defines a first passage 203a, 203b, 203c, 203d, 203e and a second passage 203e, 205, 203b, 203a.

The body 201 is provided with a side opening 201d, issuing into the chamber 203d. Said opening comprises an endpiece 207 screwed onto the body. In said endpiece is placed a plug 208 which seals off the opening from the outside atmosphere. Said plug 208 contains an internal blind bore 208a inside which can slide the tail 209a of a valve 209. The edges of the wall 201b adjacent the mouthpiece of the conduit 203c into the chamber 203d are shaped to form a valve seat 210 adapted to cooperate with the head of the valve 209. A spring 211 is coupled between the valve 209 and the plug 208 to return the said valve on its seat 210.

It is obvious then that the first passage defined hereinabove can be closed off in its section 203c by the valve 209. Said valve functions in the same way as the ones described above.

For example, to regulate the value of the gas saving desired, the tension for returning the valve 209 on its seat 210 must be set. The spring 211 being an open-coil spring, its tension is caused to vary by moving the plug 208 with respect to the seat 210.

To this effect, the said plug is screwed into the endpiece 207 and a rotation of the latter by means of its polygonal housing 208b thus permits to alter its axial position. In order to view this position, a stack of washers 212a, 212b, 212c, 212d of contrasting colors (such as red, orange, yellow, white, starting from the bottom upwards) have been placed around the end portion of the plug 208, said washers being axially fixed on the plug, but free to rotate about the latter. Depending on the position of the plug said stack of washers will be more or less projecting from the endpiece 207 (or from an external hood of protection 213 screwed thereon) and it will be possible to known instantly at a simple glance whether some gas is being saved (with only a few or no washers projecting from the endpiece) or not (all the washers projecting), as shown in FIG. 5, respectively. The advantage of the polygonal housing (for example hexagonal) 208b which only allows the operation of the plug 208 (and therefore its setting to an adjusted position or its unsetting) by means of a tool, is obvious. In this way, any inadvertent or deliberate unsetting by hand is prevented, since acting on the washers 212 cannot lead to the screwing up or unscrewing of the plug.

Figure 6:
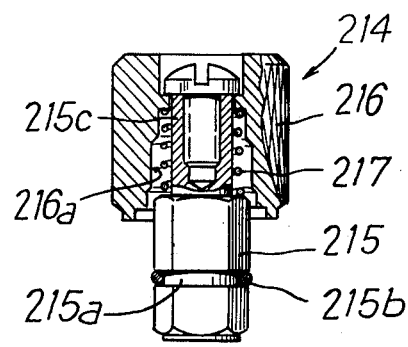
FIG. 6 is a view of a knob for effecting adjustments of the device.

It may however be advantageous to have a member with which to effect the adjustments without the help of a tool. An embodiment of such a member is illustrated by way of example on FIG. 6, which member can, if the necessity arises, be removed, thus leaving the same polygonal housing. The member in question can be constituted by a milled knob 214 whose lower part 215 is adapted to be housed, in the housing 208b. Said part 215 has a groove 215a in which is located a ring 215b. Said ring ensures the clipping of the knob inside the housing when it extends between grooves 215a and 208c of housing 208b. Such clipping could be effected in order not to resist to a traction of predetermined value for separating the two parts and recover the case illustrated in FIG. 5.

The milled part of the knob can be produced in one piece with the said part 215. It is however advantageous to make provision for a knob in two parts, releasable with respect to one another in order to limit the risk of inadvertent operations. To this effect, the said part 215 will be extended at the top by a cylindrical extension 215c on which a part 216 is freely rotatable. A spring 217 is interposed between the two parts, in order to push the part 216 upwards with respect to the part 215. Said part 216 is provided with a polygonal recess 216a, which engages the part 215 when the part 216 is pushed in against the action of the spring 217. Thus, it is only possible to drive the plug 208 in rotation with the milled part 216 after pushing in the latter to ensure its connection in rotation with the part 215.

Figure 7:
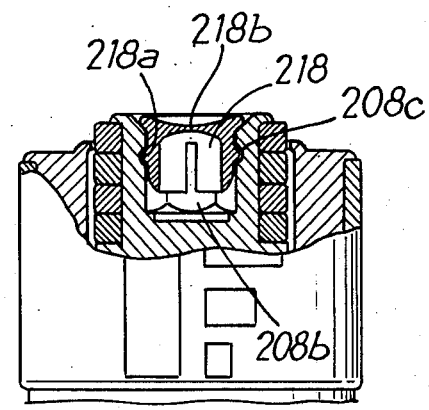
FIGS. 7 and 8 illustrate two other specific means of the invention.

FIG. 7 illustrates one of the means of the invention which is used to reduce the risks of the device going out of adjustment, with a member which seals off the access to the housing 208b.

Said member is constituted by a plug 218 in plastic material, which can be resiliently clipped in the housing 208b, by means of a peripheral beading 218a cooperating with the groove 208c. An upper membrane 218b has to be perforated to remove the plug.

Figure 8:
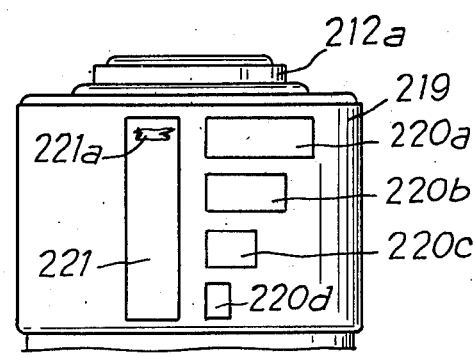

Finally, FIG. 8 shows a surface 219, which in the illustrated embodiment, is constituted by a cylindrical sleeve mounted for decelerated rotation on the endpiece 207 which bears a cross-indication of the colors of the washers 212a to 212d. Said cross-indication is given so that each surface (220a to 220d) occupied by each color is significant of the extent of the saving. For example, if only the washer 212a projects from the endpiece, a large amount of gas has been saved. The corresponding color 220a is the one to which the largest surface has been allocated. Opposite that scale of colors, the sleeve comprises a marking surface 221. Said surface is designed to be marked with a sign (221a) opposite the color corresponding to the last washer projecting from the endpiece after a setting operation. It is thus possible to register at least an optimum setting at which the device can be re-set if the need arises.

Said sleeve can include two or three marking possibilities for successive settings.

Variants of these registering means are possible. For example, the sleeve 219 can be fitted over with a masking member from which a detachable strip can be pulled, which only shows the color corresponding to an optimum setting.

The invention finds an interesting application in the field of pneumatic installations.

It is not limited to the description given hereinabove, but on the contrary covers any variants that can be made thereto without departing from the scope or the spirit thereof.

What is claimed is:

1. A compressed gas saving device for use in a pipe system connecting a control valve outlet to the inlet of a pressure user apparatus, said device comprising a body formed with a first passage extending from a first end to a second end of said body, means adjacent said second end connecting said first passage to said control valve outlet, means connecting said first passage to said pipe system, a seat in said first passage, a valve adapted to engage said seat to close said first passage, a return spring member for urging said valve into engagement with said seat, means including a manually operable member for adjusting the force exerted by said spring member on said valve, said spring member opposing the rising force of the valve generated by the gas flowing from the control valve, a second passage provided in the body, said second passage constituting a shunt in parallel with the first passage for bypassing said valve, said second passage provided with a one-way valve, the flow direction of which is that of gas issued from the pressure-user apparatus, a visual indicator positionable with relation to an external surface of said body, and means responsive to said adjusting means for positioning said visual indicator.

2. A device in accordance with claim 1 in which said body comprises an endpiece at the first end of said body, said adjusting means comprising a plug in said passage, said plug being axially adjustable within said endpiece, said valve comprising a valve member movable with respect to said plug, said spring being disposed between said plug and said valve member, said visual indicator comprising an end portion integral with said plug, said end portion projecting from the end of said endpiece.

3. A device as in claim 2 in which said body is shaped as an elbow connector, said body comprising a first element having a central cavity forming part of said first passage, said cavity being closed off by said plug at its end remote from the second end of the first passage, said first element being formed with at least two separate side openings at the respective sides of said seat, and a second element formed with a transverse bore for receiving the first element and with a longitudinal conduit communicating with the cavity of the first element through the side opening thereof on the valve side of said seat, said longitudinal conduit selectively through the other side opening by means of said one-way valve.

4. A device as in claim 2 including means mounting said plug in fluid-tight relationship in said passage for sliding movement relative to said body, said adjusting means comprising interengageable threads on said endpiece and said plug, said visual indicator comprising a stack of washers of contrasing colors, and means mounting said washers on said end portion for rotation relative thereto and for axial movement therewith, the end of said endpiece masking one or more of said washers depending on the position of said plug relative to said endpiece.

5. A device as in claim 4 in which said plug end portion is formed with a recess of polygonal cross-sectional shape by means of which said plug can be rotated.

6. A device as in claim 5 including a milled knob having a lower part adapted to be received in said recess, a manually actuable upper part, means mounting said upper part on said lower part for axial movement between a first position in which it is freely rotatable with respect to said second part and a second position in which it is coupled in rotation with said second part and a spring disposed between said parts to urge said upper part to said first position.

7. A device as in claim 5 including means for sealing off access to said plug.

8. A device as in claim 7 in which said sealing means is a sealing cap, said recess being formed with a groove, said cap being provided with means adapted to be clipped into said groove.

9. A device as in claim 4 including a sleeve carried by said endpiece, said sleeve having a surface provided with markings having colors correlated with the colors of said washers of said stack, said markings being of such respective sizes as to indicate the savings effected by various washer settings and a marking surface portion of said surface.

10. A device as in claim 2 in which said first-named valve has a head formed with a peripheral groove and an annular seal in said groove for cooperation with said seat, the end of said valve remote from said seal being slidable in said plug, said valve end housing said return spring.

* * * * *